(12) United States Patent
Ladd et al.

(10) Patent No.: US 7,979,523 B2
(45) Date of Patent: Jul. 12, 2011

(54) DEFERRED INVOCATION OF COMMUNICATION SERVICES

(75) Inventors: David Ladd, Lisle, IL (US); Narasimha R. Rachumallu, Parsippany, NJ (US); Aeryung Moon, Warren, NJ (US); Leo Nieuwesteeg, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 923 days.

(21) Appl. No.: 11/745,781

(22) Filed: May 8, 2007

(65) Prior Publication Data
US 2008/0281957 A1 Nov. 13, 2008

(51) Int. Cl.
*G06F 15/173* (2006.01)
*G06F 3/00* (2006.01)
*G06F 11/00* (2006.01)

(52) U.S. Cl. .......................... 709/223; 719/318; 370/230

(58) Field of Classification Search .................. 709/223, 709/224, 352; 370/352; 719/318
See application file for complete search history.

(56) References Cited

U.S. PATENT DOCUMENTS

| | | | | |
|---|---|---|---|---|
| 6,988,126 B2* | 1/2006 | Wilcock et al. | ............... | 709/204 |
| 7,000,019 B2* | 2/2006 | Low et al. | ..................... | 709/227 |
| 7,334,017 B2* | 2/2008 | Hawkes et al. | ............... | 709/205 |
| 7,463,619 B1* | 12/2008 | Prokop et al. | ................ | 370/352 |
| 7,496,672 B2* | 2/2009 | Orton et al. | ................... | 709/230 |
| 7,630,328 B2* | 12/2009 | Wright et al. | ................. | 370/260 |
| 7,664,097 B2* | 2/2010 | White et al. | .................. | 370/352 |
| 7,792,275 B2* | 9/2010 | Tai et al. | .................... | 379/265.09 |
| 2002/0010771 A1* | 1/2002 | Mandato | ....................... | 709/223 |
| 2002/0073210 A1* | 6/2002 | Low et al. | ..................... | 709/228 |
| 2003/0231741 A1* | 12/2003 | Rancu et al. | ..................... | 379/9 |
| 2007/0086582 A1* | 4/2007 | Tai et al. | ................... | 379/114.01 |
| 2007/0088836 A1* | 4/2007 | Tai et al. | ....................... | 709/227 |
| 2007/0201665 A1* | 8/2007 | Kocan et al. | ............. | 379/201.02 |
| 2008/0162637 A1* | 7/2008 | Adamczyk et al. | ........... | 709/204 |
| 2008/0205267 A1* | 8/2008 | El Barachi et al. | ........... | 370/230 |
| 2009/0122794 A1* | 5/2009 | Wu et al. | ....................... | 370/352 |
| 2010/0211666 A1* | 8/2010 | Kvernvik et al. | ............. | 709/223 |

OTHER PUBLICATIONS

"CR to Rel-5 WI 'IMS-CCR" 3GPP TSG CN Meeting #27, Mar. 9-11, 2005, Tokyo, Japan, 66 pages.

* cited by examiner

*Primary Examiner* — Yemane Mesfin
*Assistant Examiner* — Muktesh G Gupta
(74) *Attorney, Agent, or Firm* — Fish & Richardson P.C.

(57) ABSTRACT

In one embodiment, a network device determines one or more conditions for invoking one or more real applications to the network device for a session. This determination may be made at the initiation of the session, such as when a SIP INVITE message is received. The one or more conditions allow real applications to be invoked when a future event satisfies the condition. When it is determined that a condition is satisfied, a real application associated with the condition is then invoked. Accordingly, conditions may be set for real applications that may be tested against future events that have not yet occurred. This allows deferred invocation of real applications. Accordingly, if real applications are not needed for a session, then they are not invoked. But, when a real application is needed, it can be invoked.

18 Claims, 3 Drawing Sheets

DEFERRED INVOCATION OF COMMUNICATION SERVICES

TECHNICAL FIELD

Particular embodiments generally relate to telephony.

BACKGROUND

In the 3GPP Internet protocol (IP) multimedia subsystem (IMS), a serving call session control function (S-CSCF) controls the invocation of telephony features by selectively invoking the features as part of the session initiation. To invoke a given feature, the S-CSCF constructs and sends a session initiation protocol (SIP) message to an external server that provides the feature. The application on the server then processes the message to provide the feature. For example, the application may act as a proxy and send the request back to the S-CSCF for future processing, act as a forking proxy initiating new call legs, act as a back-to-back user agent initiating a related but technically new call attempt, or send a final response that denies the call attempt. This involves a number of messages that may have to be sent. As the overall number of features implemented in a network grows, the number of SIP messages involved in initiating calls grows.

The S-CSCF will always invoke a number of features when the call is initiated. For example, for a certain subscriber or class of subscribers, a set number of features are invoked. However, the number of applications that may actually need to be used on the call may be less than the number of applications that are invoked. There is no way of knowing which applications will be needed as the session progresses; thus, all the applications that may possibly be needed are invoked initially at the beginning of the session. This may result in unused applications and unnecessary messaging that is performed to invoke the applications.

DESCRIPTION OF EXAMPLE EMBODIMENTS

Overview

In one embodiment, a network device determines one or more conditions for invoking one or more real applications to the network device for a session. This determination may be made at the initiation of the session, such as when a SIP INVITE message is received. The one or more conditions allow real applications to be invoked when a future event satisfies the condition. When it is determined that a condition is satisfied, a real application associated with the condition is then invoked. Accordingly, conditions may be set for real applications that may be tested against future events that have not yet occurred. This allows deferred invocation of real applications. Accordingly, if real applications are not needed for a session, then they are not invoked. But, when a real application is needed, it can be invoked.

Example Embodiments

Figure 1:
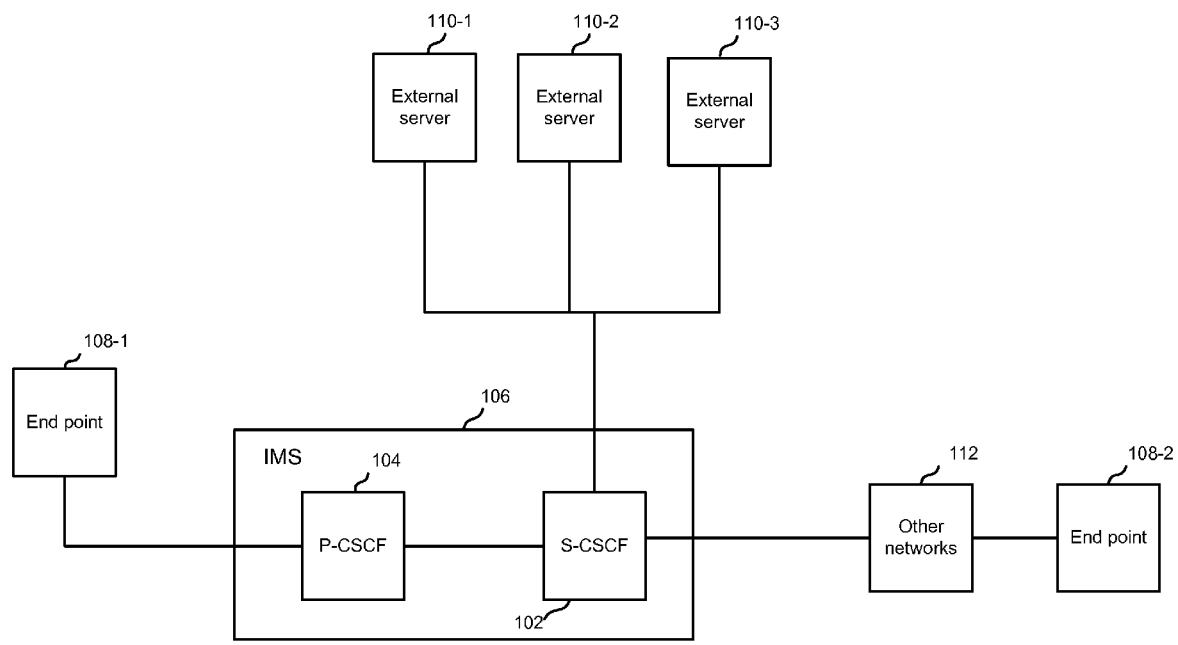
FIG. 1 depicts an example of a system for providing deferred invocation of real applications.

FIG. 1 depicts an example of a system for providing deferred invocation of real applications. An IMS compliant network 106 is described for discussion purposes; however, it will be understood that other embodiments may not include an IMS infrastructure. Also, the system includes end points 108, servers 110, and other networks 112.

As shown, IMS 106 includes a proxy-control session control function (P-CSCF) 104 and a serving-control session control function (S-CSCF) 102. Other components of IMS 106 may be appreciated by a person skilled in the art but are not described.

P-CSCF 104 is a SIP proxy that is the first point of contact for end points 108. P-CSCF 104, as it is known in the art, sits in the path of signaling messages and can provide authentication for end point 108.

S-CSCF 102 sits in the signaling plane and may be a SIP server. S-CSCF 102 may provide session control for a session with end points 108. S-CSCF 102 may be a function provided on a network device in IMS 106.

Other network devices 112 and end points 108 may be participating in a voice call with end point 108-1. In one example, end point 108-1 may make a call to end point 108-2. When a call is made, a session may be established for the call. Although a voice call is described, it will be understood that a session may include any communication. For example, a session may include a streaming video session, instant messaging session, voice call, etc. Also, two end points need not be on a voice call. Rather, end point 108-1 may be a device receiving streaming video from an application on end point 108-2.

Servers 110 may provide features for a session. For example, servers 110 may be application or feature server. To provide the features, servers 110 need to be contacted to invoke the application.

Particular embodiments provide a deferred invocation of real applications on servers 110. For example, S-CSCF 102 may include one or more conditions for invoking real applications for a session. Thus, a session may be initiated and conditions for real applications may be set. The conditions may be triggered when a future event occurs. Thus, as the session proceeds, it is determined if one of these conditions is met. If a condition is met, then the real application associated with the condition may be invoked. At this point, S-CSCF 102 may send a message to external server 110 to invoke the application. Then, messaging may be performed to invoke the application to perform the feature. Conventionally, S-CSCF 102 would invoke all real applications that were specified for a session. For example, there was no choice as to which real applications could be invoked at a later time. Rather, all the real applications specified by initial filter criteria were invoked when the session was initiated. However, in contrast, particular embodiments provide a method for specifying deferred invocation of real applications. Thus, messaging to invoke applications is avoided until the application is actually needed. This prevents unnecessary messaging.

Figure 2:
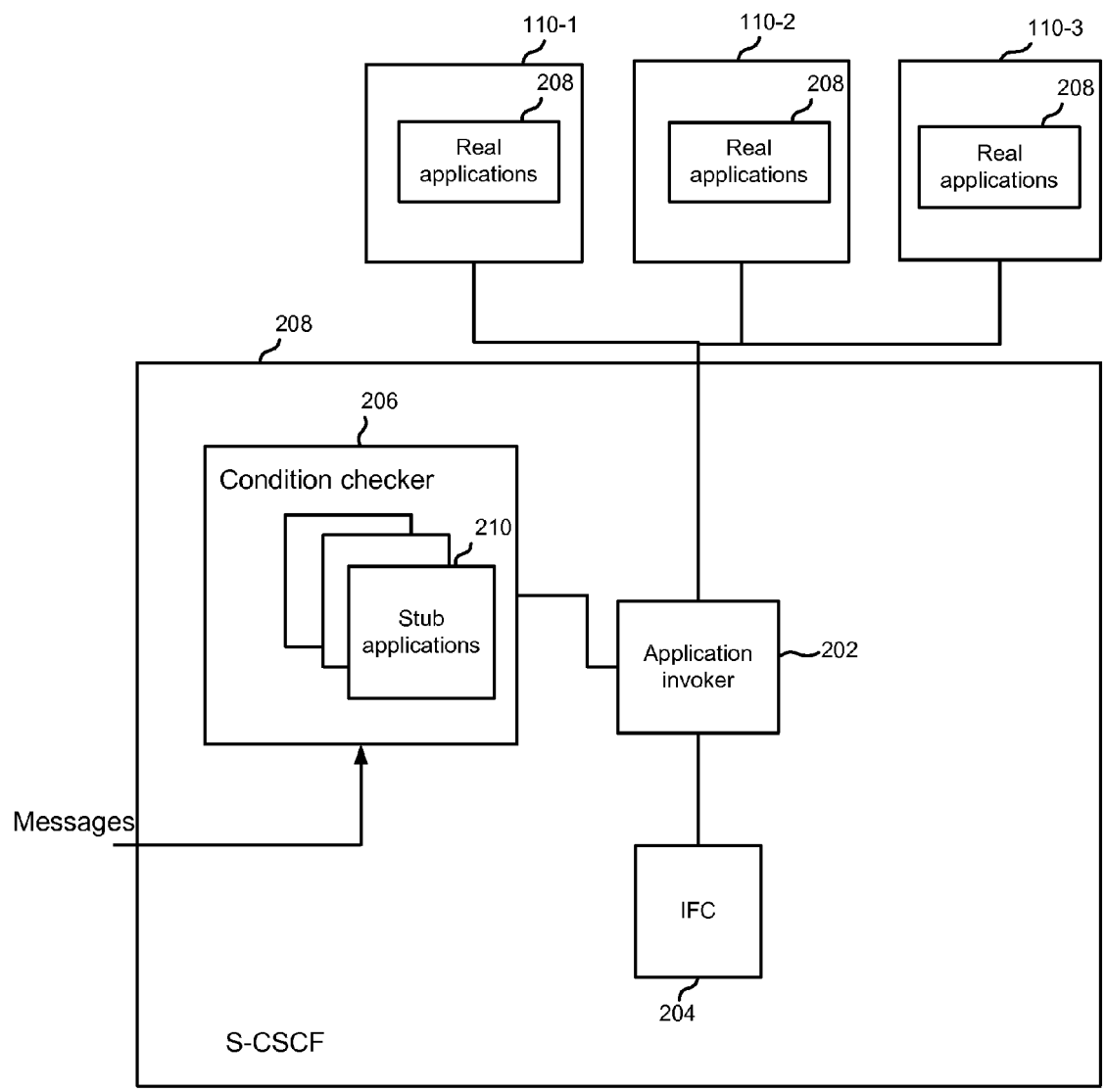
FIG. 2 depicts a more detailed embodiment of a S-CSCF.

FIG. 2 depicts a more detailed embodiment of S-CSCF 102. S-CSCF 102 includes an application invoker 202, an initial filter criteria (IFC) 204, a condition tracker 206, real applications 208, and stub applications 210.

Application invoker 202 is configured to invoke applications. For example, application invoker 202 may invoke real applications 208 and stub applications 210. Real applications 208 may be any applications that are configured to provide a feature or service to S-CSCF 102. For example, real applications 208 may be external applications to S-CSCF 102. Also, real applications 208 may be internal to S-CSCF 208. Although real applications 208 are shown as being on servers 110, it will be understood they may reside anywhere.

Stub applications 210 may be any logic that can check to see if conditions are met. For example, stub applications may be small segments of SIP application logic that can perform a limited set of operations in a manner similar to real applications 208. However, the logic is substantially more efficient in that the full features do not need to be provided by stub applications 210. Rather, stub applications 210 check to see if conditions are met before the real application invocation is performed. A stub application may not be the real application. For example, the stub application is not able to provide the full feature or service of the real application. Rather, the stub application may be similar to the real application but may test whether a condition is met and then cause the real application to be invoked to provide the feature or service. Stub application 210 is shown as being internal to S-CSCF 102 but stub application 210 may be found anywhere, such as external to S-CSCF 102.

Initial filter criteria 204 may be specified by a user. The initial filter criteria may be an extensible mark-up language (XML) dialect that filters feature invocations according to specific testable facts about the session that are reflected in a SIP message. The initial filter criteria allows users to specify what order and under what conditions various real applications 208 in the network are to be invoked during a session initiation. For example, the condition for invoking a feature is a Boolean combination of primitive tests, which may be referred to as service point triggers (SPTs). The initial filter criteria are extended to test non-initial conditions. That is, events that may occur after initial invocation of real applications are tested to see if they invoke the initial filter criteria, and thus a real application.

Initial filter criteria 204 may include deferred evaluation SPTs that are tests of future events. The future events may be any events that occur after the initial filter criteria 204 is read and evaluated for the session. For example, initial filter criteria 204 may be evaluated against the session initiating message to determine which criteria are satisfied. The events may be based on messages that are received, time-outs, etc. When a session is initiated, such as when a SIP INVITE message is received, then the initial filter criteria 204 may be tested to see which real applications 208 may be needed for the session. Some of these real applications 208 may be invoked initially and some may not be invoked right away. The deferred evaluation SPTs allow deferred invocation of real applications 208.

Application invoker 202 thus processes a list of initial filter criteria for the session. For example, different sessions or call attempts may be associated with different lists of initial filter criteria. For example, an instant messaging session may have a list of initial filter criteria and a voice over Internet Protocol (VoIP) telephone call may have a second list of initial filter criteria.

For each initial filter criteria in the list, it is determined whether deferred invocation or initial invocation should be performed. For example, if a condition for a future event is provided with the filter criteria, then a stub application 210 may be invoked. If a condition for a future event is not provided, then the real application 208 may be invoked initially.

Thus, application invoker 202 may invoke the real applications that should be invoked initially. In this case, application invoker 202 may communicate with servers 110 to invoke the application to provide the feature.

Application invoker 202 may also invoke one or more stub applications 210. As the session set-up proceeds, different messages or time-outs may occur. Condition checker 206 checks whether the conditions for stub applications 210 are met. Stub applications 210 evaluate the conditions and if a condition is met, then a real application 208 is invoked that is associated with the condition. For example, application invoker 202 may be contacted and the application is invoked. Accordingly, it is expected that the condition corresponds to a future event that may indicate a real application is needed. Accordingly, when that future event occurs, the real application that may be needed is invoked.

Figure 3:
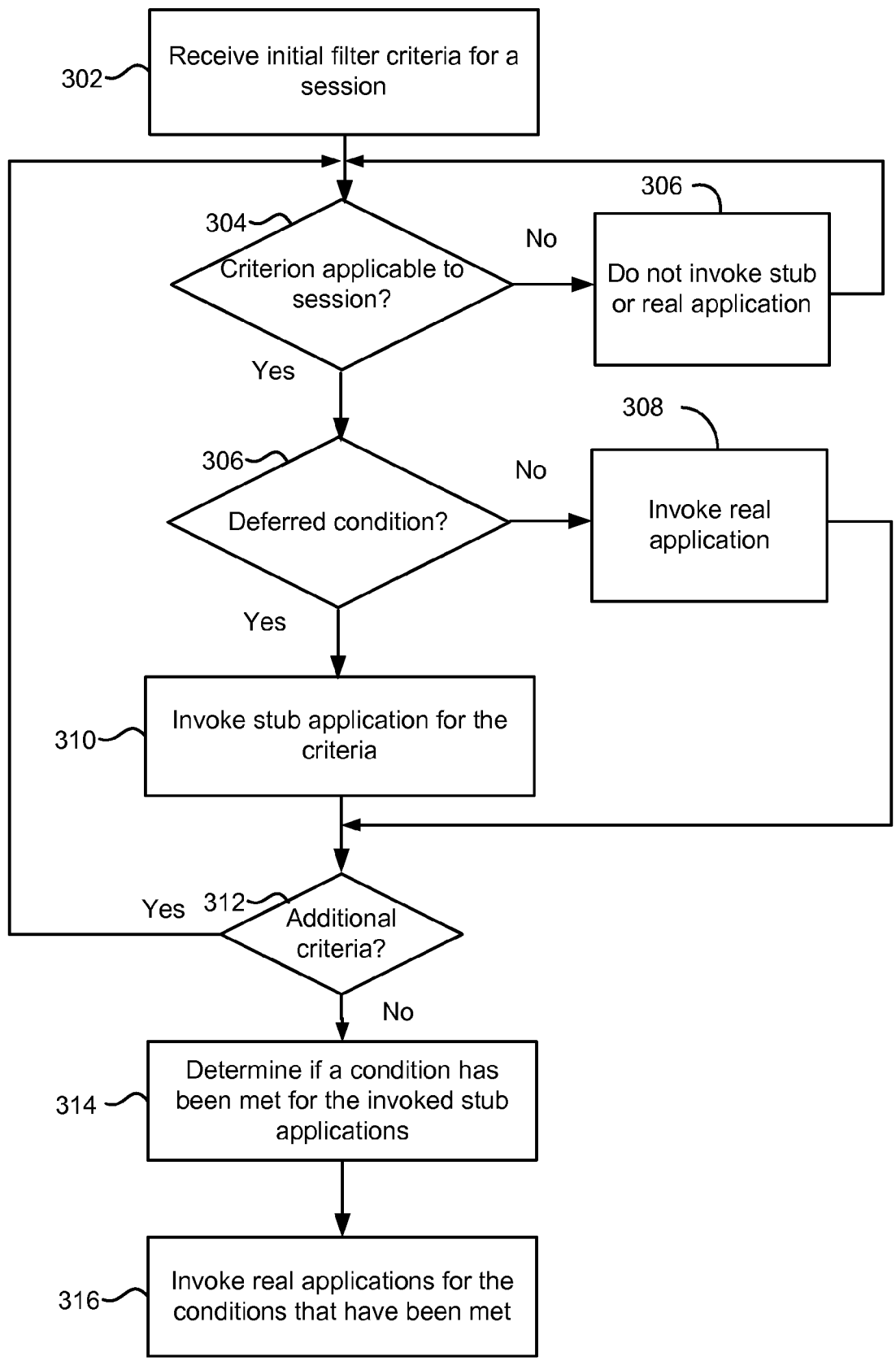
FIG. 3 depicts a simplified flowchart of a method for providing deferred invocation of real applications.

FIG. 3 depicts a simplified flowchart of a method for providing deferred invocation of real applications. Step 302 receives initial filter criteria for a session. Step 304 then determines if a filter criterion is applicable for a session. For example, the initial filter criterion is tested against a session initiating message to determine if it is applicable for the session. If not, step 306 does not invoke an internal or real application.

However, if the initial filter criterion is application, step 308 determines if the initial filter criterion includes deferred conditions. For example, application invoker 202 may split the initial criteria list into two lists. One list may include a list for deferred invocation and another list is for initial invocation. If the criterion does not include deferred conditions, then step 308 invokes a real application 208 as described above. The process then proceeds to step 312.

If deferred conditions are included, step 310 invokes stub application 210 for the criterion. Step 312 then determines if there are more criteria in the initial filter criteria. If so, the process reiterates to step 304.

If there are no more criteria to process, step 314 then determines if a condition has been met. For example, the conditions may be simple tests, such as conditionals of SIP message="value". A specific example is SIP response code="486". This conditional may be triggered when a 486 SIP message is received indicating that end point 108 is busy. Thus, an application is only called when a busy response is received. In this example, the real application may be needed to fork another leg to a voicemail server for the call. Also, the real application may never be invoked. For example, an instant message logging application might only care about SIP MESSAGE methods. Thus, if a SIP MESSAGE method is not sent, then the instant messaging logging application does not need to be invoked. Further, a timer may be set such that when it expires, then a condition is met. Thus, a real application 208 may then be invoked after a certain time period.

Step 316 then invokes real applications 208 for the conditions that have been met. Thus, conditions that are not met during the session set-up are not invoked. Accordingly, the resources that are used for application invocation are avoided.

Accordingly, a user may insert tests in initial filter criteria that are triggered by future events. Certain messages, time-outs, or any other information may be associated with these conditions for application invocations. This allows for saving of resources that do not need to be invoked for a session.

Although the description has been described with respect to particular embodiments thereof, these particular embodiments are merely illustrative, and not restrictive. Although SIP is described, it will be understood that other protocols may be used. Further, it will be understood that an IMS infrastructure does not need to be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:

initiating a session at a network device;

determining, during initiation of the session at the network device and based on receiving a list of feature invocations for the session at the time of initiation, a first condition for invocation of a first real application at the time of initiation of the session and a second condition for invocation of a second real application at a later instant in time;

invoking the first real application at the time of initiation of the session, based on the determination of the first condition;

invoking a stub application at the time of initiation of the session, based on the determination of the second condition, where the stub application includes a subset of features and services of the second real application and performs a limited set of operations in a manner similar to the second real application; and invoking the second real application based on a determination, with the stub application and during execution of the session, that a condition is met for invocation of the second real application.

2. The method of claim 1, wherein the event comprises receiving a message during the session set up, the method further comprising:

determining if the message meets one of the one or more conditions.

3. The method of claim 1, wherein the event occurs during messaging to set up the session.

4. The method of claim 1, wherein real applications are invoked only when needed as determined by the event.

5. The method of claim 1, wherein the event occurs after a SIP INVITE message is sent.

6. The method of claim 1, wherein the network device comprises a serving-call session control function (S-CSCF).

7. The method of claim 1, wherein the event comprises a time-out event of a time period, wherein the real application is invoked upon the time-out event.

8. The method of claim 1, wherein the real application is included in an external network device that is separate from the network device.

9. An apparatus comprising:
one or more processors; and
logic encoded in one or more tangible media for execution by the one or more processors and when executed operable to:
initiate a session at a network device;
determine, during initiation of the session at the network device and based on receiving a list of feature invocations for the session at the time of initiation, a first condition for initial invocation of a first real application and a second condition for invocation of a second real application at a later instant in time;
invoke the first real application at the time of initiation of the session, based on the determination of the first condition;
invoke a stub application at the time of initiation of the session, based on the determination of the second condition, where the stub application includes a subset of features and services of the second real application and performs a limited set of operations in a manner similar to the second real application; and
invoke the second real application based on a determination, with the stub application and during execution of the session, that a condition is met for invocation of the second real application.

10. The apparatus of claim 9, further comprising:
determining which of the plurality of filter criteria specify initial invocation of a real application; and
invoking the real application for the filter criteria that specify initial invocation upon initiation of the session.

11. The apparatus of claim 9, wherein the event comprises receiving a message during the session set up, wherein the logic when executed is further operable to:
determine if the message meets one of the one or more conditions.

12. The apparatus of claim 9, wherein the event occurs during messaging to set up the session.

13. The apparatus of claim 9, wherein real applications are invoked only when needed as determined by the event.

14. The apparatus of claim 9, wherein the event occurs after a SIP INVITE message is sent.

15. The apparatus of claim 9, wherein the network device comprises a serving-call session control function (S-CSCF).

16. The apparatus of claim 9, wherein the event comprises a time-out event of a time period, wherein the real application is invoked upon the time-out event.

17. The apparatus of claim 9, wherein the real application is included in an external network device that is separate from the network device.

18. A computer readable non-transitory storage media having computer executable instructions embodied therein, the computer executable instructions when executed by a processor operable to:
initiate a session at the apparatus;
determine, during initiation of the session at the apparatus and based on receiving a list of feature invocations for the session at the time of initiation, a first condition for invocation of a first real application at the time of initiation of the session and a second condition for invocation of a second real application at a later instant in time;
invoke the first real application at the time of initiation of the session, based on the determination of the first condition;
invoke a stub application at the time of initiation of the session, based on the determination of the second condition, where the stub application includes a subset of features and services of the second real application and performs a limited set of operations in a manner similar to the second real application; and
invoke the second real application based on a determination, with the stub application and during execution of the session, that a condition is met for invocation of the second real application.

* * * * *